Уnited States Patent [19]
Lahlou

[11] 3,810,316
[45] May 14, 1974

[54] STUDENT TEACHING SYSTEM AND THE LIKE AND RELATED METHOD
[76] Inventor: Bachir Lahlou, 26 E. 91st St., Apt. 3D, New York, N.Y. 10018
[22] Filed: July 3, 1972
[21] Appl. No.: 268,594

[52] U.S. Cl. .................. 35/8 A, 35/35 C, 179/6 E
[51] Int. Cl. .............................................. G09b 7/00
[58] Field of Search............. 35/8 R, 8 A, 9 R, 9 A, 35/9 B, 9 E, 35 R, 35 C, 35 D, 48 R; 178/6.6 A; 179/2 R, 2 A, 2 DP, 6 R, 6 AC, 6 E, 100.2 MD

[56] References Cited
UNITED STATES PATENTS

| | | | |
|---|---|---|---|
| 3,725,589 | 4/1973 | Golden | 179/2 A X |
| 3,597,543 | 8/1971 | Mallebrein | 179/2 A X |
| 3,587,180 | 6/1971 | Richt | 35/35 C |
| 3,654,708 | 4/1972 | Brudner | 35/9 A |
| 3,609,227 | 9/1971 | Kuljian | 35/35 C X |
| 3,122,847 | 3/1964 | Redfield et al. | 35/8 A X |
| 3,331,144 | 7/1967 | Hahn | 35/8 A X |

Primary Examiner—Lawrence Charles
Assistant Examiner—Vance Y. Hum
Attorney, Agent, or Firm—Roberts & Cohen

[57] ABSTRACT

A student teaching system and related method are provided by means of which a student located at a remote station may initiate the transmission of a series of questions or the like to which he may reply. The student's replies are recorded at the location from which the questions are initially transmitted and provision is made for further recording corrections so that when a lesson is complete both the questions and corrections may be transmitted to the student. According to one embodiment of the invention, the student may be provided with a telephone having a special adapter which enables him to communicate through a telephone exchange with a central station having a tape recorder provided with a series of questions or other lesson objects requiring student responses and further provided with a recorder to record the student responses as well as the corrections. A signal device may be provided by means of which the student may signal for operator intercession or by means of which the student can reset the position of the series of lesson objects requiring student responses.

6 Claims, 6 Drawing Figures

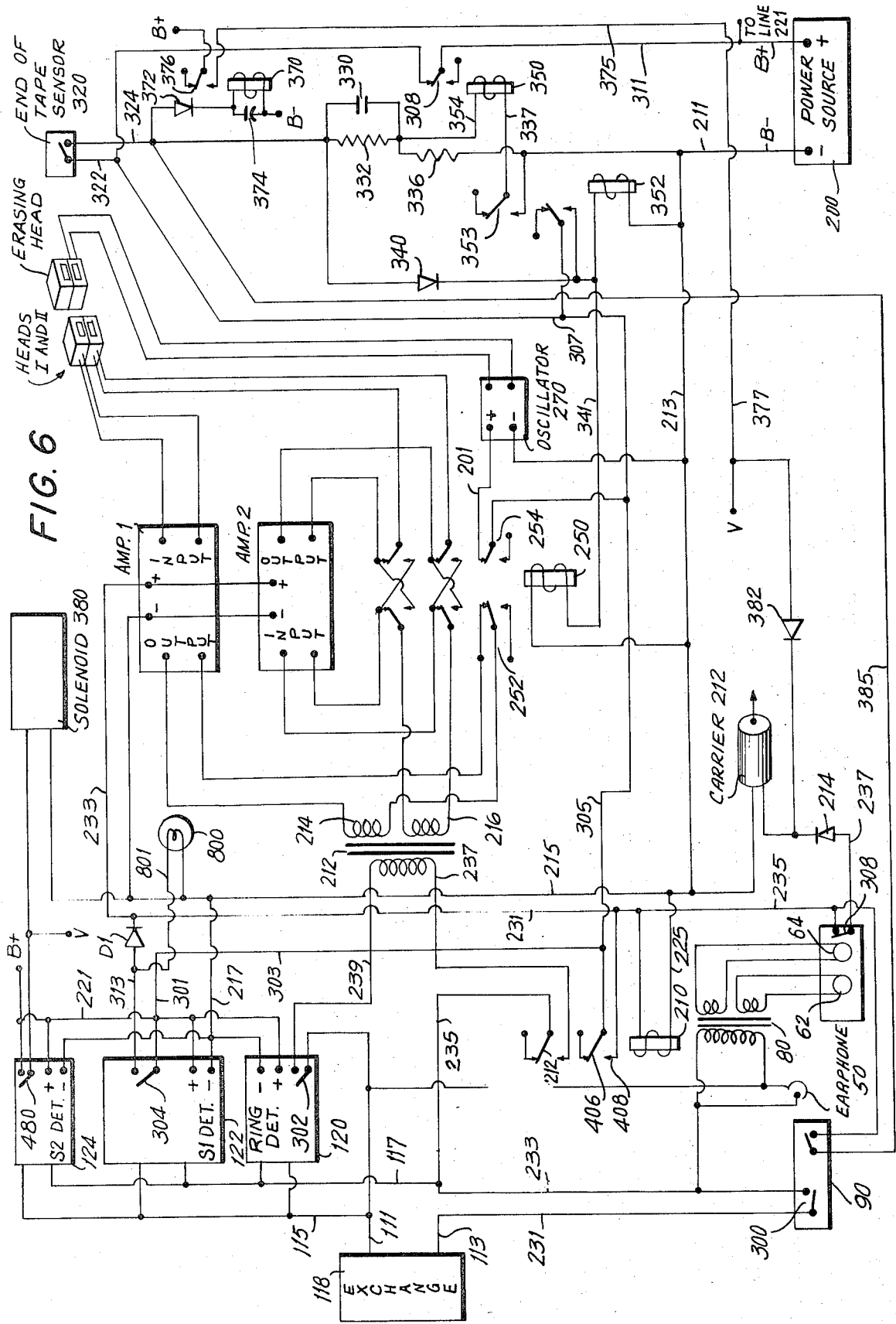

3,810,316

STUDENT TEACHING SYSTEM AND THE LIKE AND RELATED METHOD

FIELD OF INVENTION

This invention relates to instruction apparatus and methods and more particularly automatic instruction apparatus and methods in which a student from a remote station may initiate a series of lesson objects, such as questions or the like requiring student responses.

SUMMARY OF INVENTION

It is an object of the invention to provide improved instruction apparatus by means of which a student from a remote station may initiate a lesson procedure involving a series of lesson objects requiring student responses.

It is a further object of the invention to provide an improved method for instructing students in languages and in other such academic subjects.

It is still a further object of the invention to provide remote means for requiring student responses to lesson objects and to provide for recording corrections of the student responses and to provide further for re-transmitting to the student both his responses and the corrections.

It is yet another object of the invention to provide an improved instruction system which is not only capable of being used in connection with a telephone exchange system but is moreover capable of being used in an instruction laboratory and in other such areas of application.

To achieve the above and other objects of the invention there is proposed, for the teaching of an academic subject, a system comprising a central station adapted to answer incoming calls from remote parties or subscribers. The central station comprises one or more message relating devices which, upon activation from a remote command transmits to the calling party a sequence of "questions" related to the subject to be taught and records the "answers" provided by the calling party.

Each person authorized to make use of the system is provided with an adapter which is attached to his telephone. At the central station, any incoming call is preferably answered automatically.

A code signal received by the central station from the calling party starts the recording system. Then, by way of example, the following sequence of operations takes place:

1. A pre-recorded "question" from the central station
2. An "answer" by the calling party
3. A pre-recorded "correction" from the central station This sequence is recorded at the central station. This process goes on until the tape involved reaches its end, then the recorder automatically "plays back" for the listening benefit of the calling party the entire process including questions, answers and corrections.

When the tape reaches its end, the process stops and the message relating device is disengaged and ready for use again.

As one feature of the invention, an operator at the central station may "monitor" the recording process without interfering with the same. The operator may also, at any time, stop the recording process and get into direct communication with the caller.

As another feature of the invention, the caller may at any time, by depressing a switch on his adapter, call on an operator at the central station. The caller may also, by depressing another switch on his adapter, cause the tape to rewind completely or partially, if at any time, he wishes to go back to a particular "question."

BRIEF DESCRIPTION OF THE DRAWING

FIG. 6 is a partially schematic, partially block diagram of the circuitry of the apparatus of FIG. 5.

DETAILED DESCRIPTION

Figure 1:
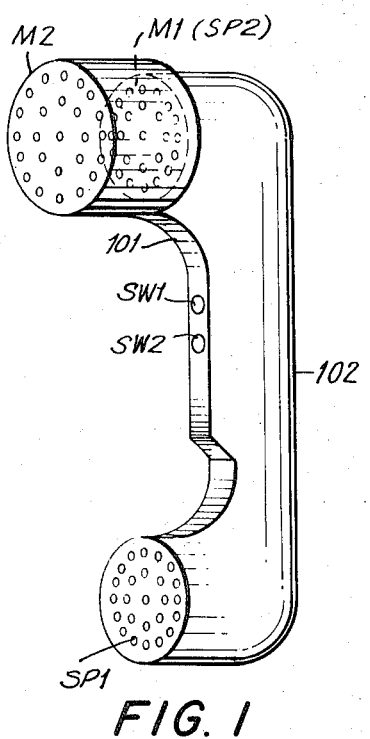
FIG. 1 diagrammatically illustrates a telephone hand set which may be employed in accordance with one embodiment of the invention.

In FIG. 1 is shown an adapter 101 which is attached to the handset of a conventional phone 102 which is used to call central station to be described hereinafter. Adapter 101 comprises microphone M2, speaker SP2 and two push button switches SW1 and SW2.

Figure 2:
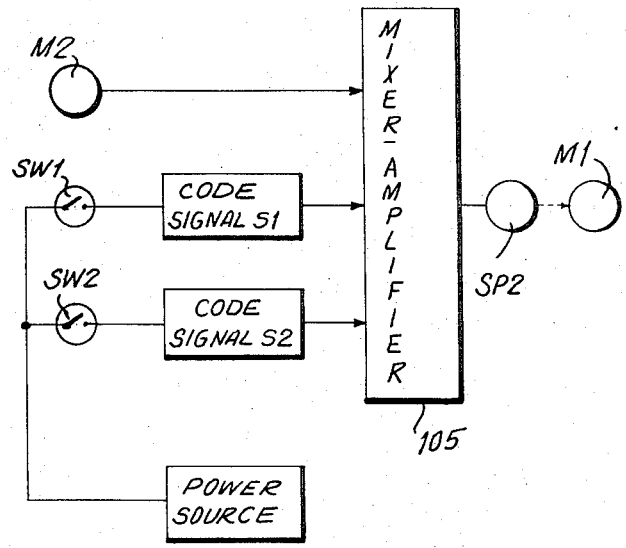
FIG. 2 is a block diagram diagrammatically illustrating how the hand set of FIG. 1 is employed.

FIG. 2 shows the actual operation of the adapter. Intelligence signals reaching microphone M2 from one using telephone 102 are exemplified by mixer-amplifier 105 and are transmitted to speaker SP2, microphone M1 (by induction) and thence to the remote central station.

Switch SW1 controls the generation of a code signal S1 which is a signal of predetermined frequency which, when received by the central station, sets the recording system "on" or indicates to an operator that there is a call for assistance. Switch SW2 controls the generator of code signal S2 which is a signal of predetermined frequency which, when received by the central station, causes the rewinding of the tape of the recording device or, in other words, a reversal thereof. Code signals S1 and S2 are amplified by mixer-amplifier 105 and are transmitted to speaker SP2 and microphone M1 and thence to the central station.

Figure 3:
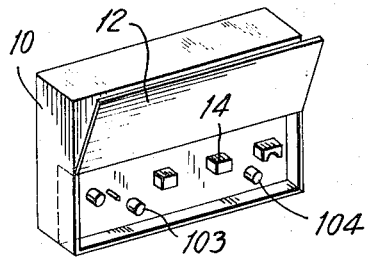
FIG. 3 illustrates a recorder in perspective and diagrammatically which may be used at the receiving station employed in accordance with one embodiment of the invention.

FIG. 3 shows a type of recording device which may be used at the central station. It may comprise, for example, tape-reel spindles 103 and 104 mounted on case 10 having a cover 12 and provided with magnetic transducer heads 14.

Figure 4:
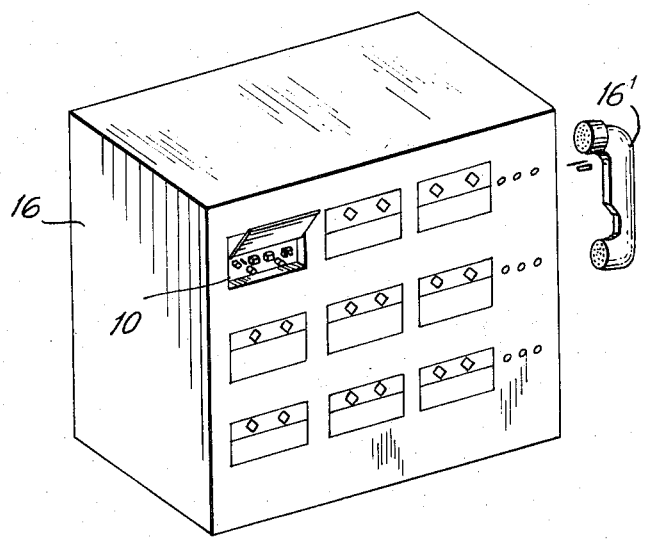
FIG. 4 illustrates diagrammatically and in perspective a panel of receiving and transmitting units.

FIG. 4 shows a panel including a plurality of recording devices 10 such as that of FIG. 3 assembled in a cabinet 16. Each recording device is associated with a telephone line.

All the recording devices may be used for the teaching of the same object or each may be used for the teaching of a separate subject (depending on the tape used).

A monitoring handset 16' may selectively be connected by a jack to any of the recording devices or alternatively there may be provided, for example, one such handset for each recording device.

Figure 5:
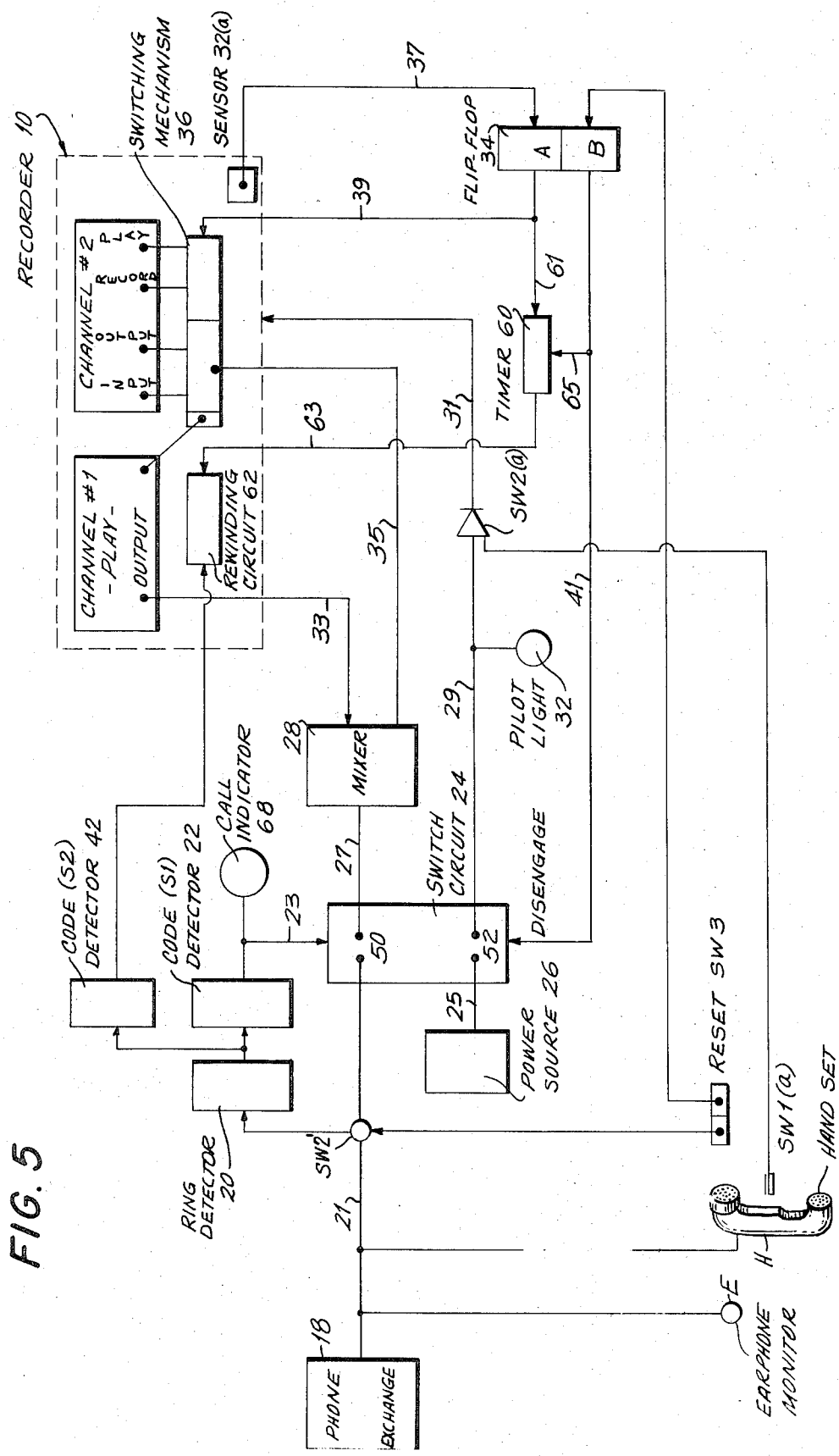
FIG. 5 is a block diagram of a central station which receives inquiries from a telephone exchange and includes the panel of FIG. 4.

FIG. 5 is a block diagram of the recording apparatus.

An incoming call received from telephone exchange 18 via line 21 is detected by ring detector 20 which puts code detector 22 in an operative or monitoring stage.

A code signal S1 received by code detector 22 (via line 21 and ring detector 20) activates switch circuit 24 via line 23. Switch circuit 24 receives power from power source 26 via line 25. Once activated, switch circuit 24 couples line 21 through mixer 28 (with proper impedance) via contacts 50 and line 27. Switch circuit 24 also provides power for recorder 10 via contacts 52 and lines 29 and 31. Power is also provided to pilot light indicator 32.

Recorder 10 comprises 2 channels. Channel No. 1 retrieves the intelligence from the associated tape and transmits it via line 33 to mixer 28 and to the calling party through exchange 18.

Channel No. 2 records on the associated tape the intelligence coming from the telephone line via mixer 28 and line 35. Having established that the intelligence from channel No. 1 is transmitted to the calling party and that the intelligence originating from the calling party is recorded into channel No. 2, it can be arranged that the intelligence originating from channel No. 1 consists of a sequence of pre-recorded "questions" related to an academic subject or the like and that the intelligence received from the telephone line and recorded into channel No. 2 consists of (a) the "questions" from channel No. 1, (b) the "answer" provided by the calling party, and (c) the "corrections" from channel No. 1.

When sensor 32(a) senses the end of the tape (e.g. by means of a silver contact, etc.) it activates, in line 37, flip flop 34 which changes from stage "A" to stage "B." Flip flop 34 also activates switching mechanism 36 via line 39 and timer 60 via line 61. Switching mechanism 36, upon activation, changes the stage of channel No. 2 from a recording function into a play back function. It also disconnects channel No. 1. Timer 60 sends a signal to rewinding circuit 62 via line 63 to activate the same and rewind the tape.

As the tape, having been rewound, starts running for a second time, the intelligence previously recorded on channel No. 2 is transmitted over line 35 to mixer 28 and through the phone line 21 to the calling party. When sensor 32(a) senses the end of the tape for the second time, it again activates flip flop 34. Flip flop 34 being already in stage "B" sends a signal via line 41 to switching circuit 24 to de-activate the same. Flip flop 34 also activates timer 60 (via line 65) which sends a signal to rewinding circuit 62 to activate the same and rewind the tape.

Once switching circuit 24 is disengaged and the tape rewound, the apparatus is reset and ready to be used again.

During the recording process, a signal S1 received by detector 22 energizes call indicator 68 to indicate a call for assistance. Also a signal S2 received by detector 42 energizes rewinding circuit 62 to rewind the tape.

The earphone monitor E permits the monitoring of the recording process. The handset H permits the operator by the action of switches SW1(a) and SW2(a) to stop the recording process and get into direct communication with the remote calling party. Reset switch SW3 permits the operator to reset the system at any time.

FIG. 6 is a partly schematic, partly block diagram of the system described in FIG. 5. In FIG. 6, element 120 is the ring detector, element 122 is the detector of signal S1, and element 124 is the detector of signal S2.

In reset switch 90, contact 300 is normally closed and, therefore, the telephone lines 111 and 113 from exchange 118 are normally present at inputs of detectors 120, 122 and 124 via lines 115 and 117. Detectors 120, 122 and 124 receive power from power source 200. Negative B− is connected to lines 211, 213, 215, 217 and positive B+ is connected to line 221.

An incoming call received through exchange 118 activates ring detector 120 which closes contact 302. A code signal S1 received through exchange 118 activates detector 122 which momentarily closes contact 304. One blade of contact 304 receives positive power B+ through lines 301, 303, 305, 307, 311 and contact 308 of relay 350. Upon closure, contact 304 transfers power B+ to line 313 through diode D1 and to the coil of realy 210. To energize the relay, relay 210 receives power B− from lines 213 and 225.

At this point, the telephone lines 111 and 113 from exchange 118 are terminated at the primary of matching transformers 212 via lines 231, 233, 235, 237 and 239 and closed contacts 302, 300 and 312.

Relay 210 also supplies power B+ from blade 406 to blade 408 and to the coil to keep the relay energized. Also, relay 210 supplies power B+ to amplifiers No. 1 and No. 2 via lines 231 and 233, and to carrier (motor) 212 via line 235, contact 308, line 237 and diode 214.

At this point, the following takes place:
the carrier puts the tape in motion.
Amplifier No. 1 amplifies the intelligence signals retrieved from the tape (track No. 1) by magnetic head No. I and sends them to coil 214 of matching transformer 212 via contact 252 of relay 250. These signals are thus transmitted via matching transformer 212 to lines 111 and 113 and through exchange 118 to the calling party.

Amplifier No. 2 normally has its input connected to coil 216 of matching transformer 212 and its output connected to head No. II, through the multiple contacts of relay 250.

Therefore, the intelligence signals coming over the phone lines through primary of matching transformer 212 are amplified by amplifier No. 2 and applied (with proper bias) to the magnetic head No. II for recording into track No. 2 of the tape. Also, output of oscillator 270 is applied to the erasing head (track No. 2) to clear track No. 2 of the tape of any previous recording. Oscillator 270 receives power (B+) from lines 201, 305 and contact 254 of relay 250. This process goes on until the tape reaches its end.

At the end of the tape, the silver contact creates a short across the contacts of sensor 320. The positive voltage B+ normally present at terminal 322 is transferred into terminal 324 and is applied through the filter constituted by condenser 330 and resistor 332 to the coil of relay 350 and resistor 336. However, relay 350 is not energized because no negative voltage B− is supplied to the coil via terminal 337 and the impulse of power is dissipated across resistor 336.

Also, the voltage B+ at terminal 324 is applied through diode 340 to the coil of relay 352 which is activated. Relay 352 transfers voltage B+ from line 307 to the coil to keep it energized and to relay 250 to energize it (via line 341). Upon activation of relay 352 negative voltage B− is supplied to the coil of relay 350 via contact 353. However, relay 350 is not energized because the condenser 330, being already charged, prevents the voltage B+ at terminal 324 from reaching coil terminal 354.

Upon activation, relay 250 switches the input of amplifier No. 2 from coil 216 of matching transformer 212 to the magnetic head No. II. It also switches the output of amplifier No. 2 from head No. II to coil 216.

Relay 250 also disengages amplifier No. 1 and oscillator 270 by the action of contacts 252 and 254.

Amplifier No. 2 is then in a position to retrieve, by the action of head No. II, the intelligence signals recorded on track No. 2 of the tape, amplify them and apply them to coil 216 and thus to the exchange for transmission to the calling party.

The voltage B+ at point 324 also activates relay 370 through diode 372. Relay 370 has a condenser 374 in parallel with the coil to create a time constant ($t = RL\text{-}C$) delaying the reopening of contact 376 by a time $t_o$ after the short at sensor 320 has terminated.

Contact 376 supplies voltage B+ through lines 375 and 377 to solenoid 380 via terminal (V). Solenoid 380, being energized, switches the action of the tape carrier from a forwarding tape motion to a rewinding tape motion and the tape is thus rewound.

After the elapse time $t_o$, relay 370 is de-energized, solenoid 380 is restored to its initial function and the tape starts a new cycle in a forward motion.

The intelligence previously recorded into channel No. 2 is therefore transmitted over the lines to the exchange and thus to the remote party. This process goes on until the tape reaches its end.

As the tape reaches its end for the second time, the silver contact again creates a short across the contacts of sensor 320. The positive voltage B+ is transferred into terminal 324 and is applied through the filter to the coil of relay 350. Relay 350, having negative voltage B− present at terminal 337, is energized. Contact 308 opens and voltage B+ is thus removed from the rest of the circuit. Relay 210 is disengaged and the phone lines are released.

Also, relay 370 iis energized (for time $t_o$) and contact 376 supplies voltage B+ to solenoid 380 and to the tape carrier via lines 375 and 377 and diode 382 to rewind the tape. Diode 214 prevents B+ from reaching relay 210. After the elapse of time $t_o$, relay 370 is de-energized and the system is disengaged and ready to be used again.

A code signal S1 received at any time during the recording process momentarily closes contact 304 of detector 122 and therefore supplies voltage B+ to pilot light 800 to energize it and indicate to the operator a call for assistance.

A code signal S2 received at any time during the recording process momentarily closes contact 480 of detector 124 and therefore supplies voltage B+ to solenoid 380 to energize it and rewind the tape.

There will now be obvious to those skilled in the art, many modifications and variations of the circuit and apparatus shown hereinabove. Particularly, it will be noted that the telephone exchange is only one possibility and that the circuits illustrated may equally as well be arranged in a language laboratory or the like where telephone communication through an exchange is unnecessary.

Referring further to the illustrated apparatus, earphone 50 permits the monitoring of the recording process without interfering with it. Handset 60 contains a microphone 52, a speaker 64 and the switch 308. When the handset is lifted, switch 308 removes the power from tape carrier 212 to stop the recording process and a direct communication is established between the operator using the handset and the remote party through matching transformer 80.

Reset switch 90 permits an operator to reset the system at any time. Once activated, switch 90 disconnects the telephone lines (contact 300) and it also supplies a voltage B+ via line 385 to relays 370, 350 and 352 to activate them and initiate the rewinding cycle and thus disengage the system.

The invention is illustrated by the above but is limited solely by the following claims and equivalents thereof.

From the above it will be seen that there has been provided instruction apparatus which comprises student inquiring means such as, for example, the handset 102 of FIG 1, which provides for initiating a lesson procedure and that there is moreover provided transmitting means responsive to said inquiring means to transmit of lesson objects requiring student responses and receiving means to receive and record the student responses, these being constituted, for example, by the recorders appearing in the form of recorder 10 in FIG. 5. The lesson procedure may be an instruction with respect to languages, history, economics and so forth. The lesson objects may be words which are to be pronounced in a foreign language or questions with respect to history, economics or the like, which require student responses, such as the proper pronunciation of foreign language words or answers to questions. It will be noted that one of the channels in recorder 10 provide for receiving and recording the student responses as well as for recording corrections for the same.

It will be further noted that the invention provides for apparatus to transmit to the student, after the receipt of at least one student response, both the response and the correction.

It will be noted that the student inquiring means is spaced from the transmitting and receiving means, as may occur in a telephone exchange system or in a language laboratory or the like.

As a feature of the invention it will be noted that there has been provided means for the student to signal for the intercession of an operator. There is furthermore provided in accordance with another feature of the invention, means to monitor the receiving means.

According to the invention, there is provided a method which comprises recording a series of lesson objects requiring student responses, initiating transmission of said series to a station remote from the location of said series by means of a signal transmitted from said station, responding to the series from said station, recording the resulting responses at said location, recording corrections of the responses at said location, and transmitting the responses and corrections to said station.

What is claimed is:

1. Instruction apparatus comprising student inquiring means for initiating a lesson procedure, transmitting means responsive to said inquiring means to transmit a series of lesson objects requiring student responses, receiving means to receive and record the student responses, a telephone exchange means coupling the inquiring means to the transmitting and receiving means, said inquiring means including a phone handset including a microphone, signal generators for generating assistance call signals and reverse signals, and a mixer for modulating said signals and signals from said microphone for transmission via said exchange means and an adapter detachably supported on said handset and housing said signal generators and also housing means for processing and transmitting voice signals, said receiving means including recording means coupled to said transmitting means to record the lesson objects along with the student responses, said recording means being reversible by said reverse signals.

2. Apparatus as claimed in claim 1 wherein said receiving means includes means to transmit to the student inquiring means, after the receipt of at least one student response, a correction.

3. Apparatus as claimed in claim 1 comprising means to monitor the receiving means.

4. Apparatus as claimed in claim 1 wherein the transmitting and receiving means include tape recorders.

5. Apparatus as claimed in claim 1 comprising a ring detector coupled to said exchange and two signal detectors coupled to said ring detector and responsive to the signals from said signal generators.

6. Apparatus as claimed in claim 1 wherein said receiving means includes a record medium and further means for automatically rewinding and replaying the same.

* * * * *